US005473600A

United States Patent [19]
Liu

[11] Patent Number: 5,473,600
[45] Date of Patent: Dec. 5, 1995

[54] EFFICIENT DATA STORAGE ARRANGEMENT FOR FAR-END ECHO CANCELLER

[75] Inventor: Chang-Tsou Liu, Fremont, Calif.

[73] Assignee: Sierra Semiconductor Corporation, San Jose, Calif.

[21] Appl. No.: 246,722

[22] Filed: May 20, 1994

[51] Int. Cl.⁶ ...................................................... H04J 3/00
[52] U.S. Cl. ........................... 370/32.1; 370/24; 375/222; 375/229; 375/260; 379/406; 379/410; 379/411
[58] Field of Search ............................... 370/24, 32, 32.1; 375/8, 10, 11, 260; 379/406, 410, 411

[56] References Cited

U.S. PATENT DOCUMENTS

| | | | |
|---|---|---|---|
| 4,868,874 | 9/1989 | Takatori et al. | 370/32.1 |
| 4,878,232 | 10/1989 | Fisher | 370/32.1 |
| 5,119,403 | 6/1992 | Krishnan | 370/79 |
| 5,189,664 | 2/1993 | Cheng | 370/32.1 |
| 5,233,630 | 8/1993 | Wolf | 375/67 |
| 5,295,159 | 3/1994 | Kerpez | 375/260 |
| 5,305,379 | 4/1994 | Takeuchi et al. | 370/32.1 |
| 5,319,636 | 6/1994 | Long et al. | 370/32.1 |

OTHER PUBLICATIONS

Joseph Braue "The State of the Modem," Data Communications International, Jun. (1991): 85–98.

Primary Examiner—Douglas W. Olms
Assistant Examiner—Shick Hom
Attorney, Agent, or Firm—Burns, Doane, Swecker & Mathis

[57] ABSTRACT

An efficient data storage scheme for an echo canceller for a high-speed modem provides for storing in bulk memory, instead of a trellis-encoded codewords, unencoded words of lesser length in bits. For a v.32terbo modem operating at 19,200 bps, for example, the unencoded word has only eight bits as compared to nine bits for the trellis-encoded codeword. Therefore, one memory word (16 bits) can be used to store two unencoded words, resulting in memory savings of 50%. More particularly, in accordance with one embodiment of the invention, full-duplex, high-speed data communications using echo cancellation is performed by storing in memory transmit data represented in a first form, at predetermined intervals substantially equal to a round-trip delay time, reading out transmit data from memory and trellis-encoding the transmit data to produce trellis-encoded transmit data, and performing echo cancellation using data derived from the trellis-encoded transmit data. In accordance with another embodiment of the invention, an apparatus for high-speed data communications includes first circuitry, having a first encoder, for producing first signal element data from multi-bit data symbols, an echo canceller, circuitry for storing the multi-bit data symbols and outputting delayed multi-bit data symbols each after a predetermined time, and second circuitry for producing from the delayed multi-bit data symbols second signal element data substantially identical to the first signal element data and for applying the second signal element data to the echo canceller.

13 Claims, 2 Drawing Sheets

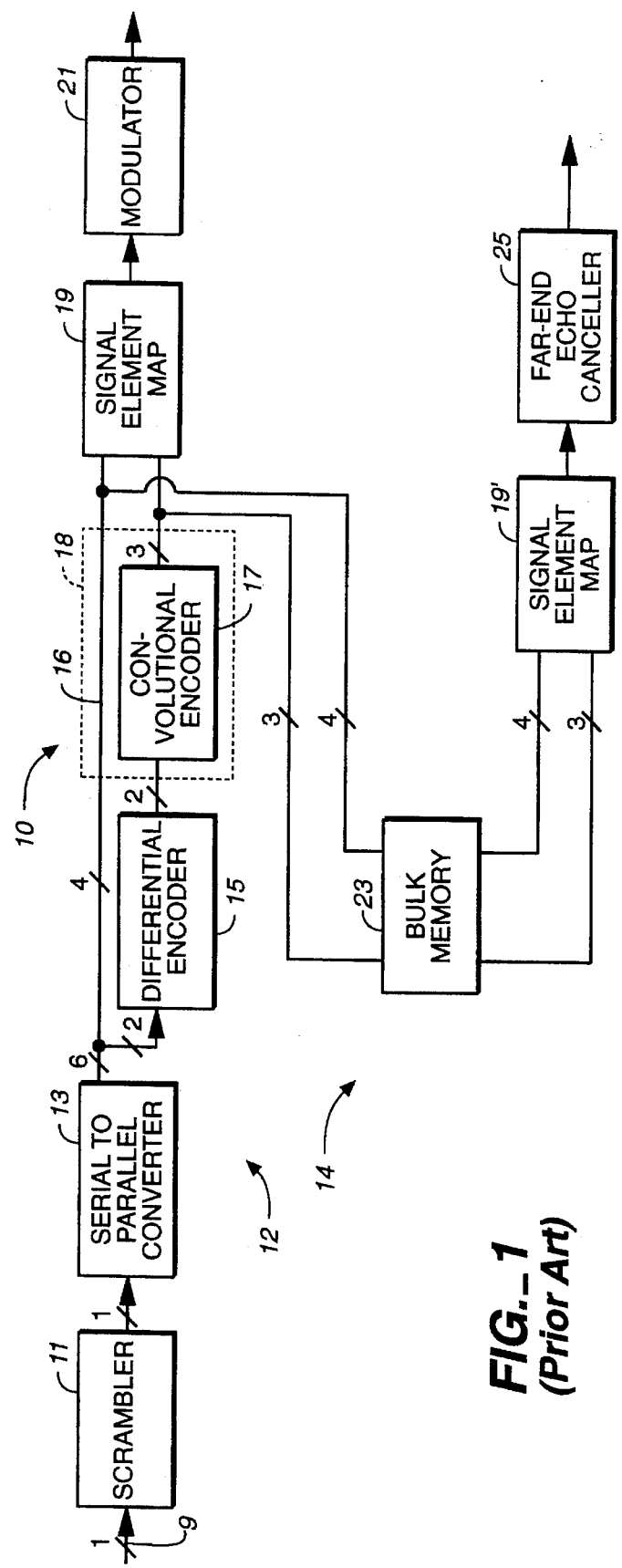
FIG._1 (Prior Art)

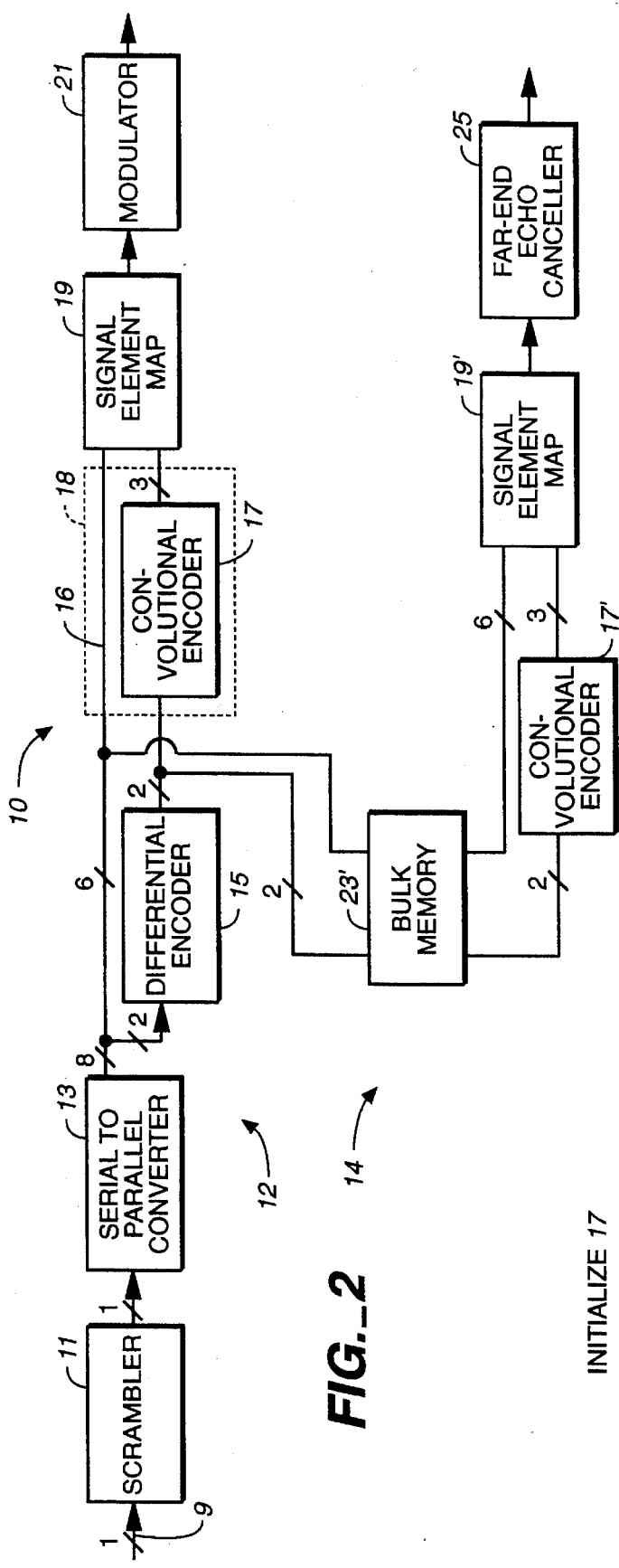

EFFICIENT DATA STORAGE ARRANGEMENT FOR FAR-END ECHO CANCELLER

BACKGROUND OF THE INVENTION

1. Field of the Invention

The present invention relates to modems, more particularly to high-speed modems employing far-end echo cancellation.

2. State of the Art

One of the primary ways in which modems differ is in the speed with which they can transfer data. For many years, modem speeds (measured in bits per second, bps) have been continually increasing. Currently, the most popular modem speeds are 2400 and 9600 bps, although the number of 14,400 bps modems installed is growing rapidly. Any modem faster than 2400 bps is currently considered high-speed. As modems have become faster and more complex, standards set by the CCITT (International Consultative Committee on Telegraphy and Telephony) have become increasingly important. Currently, the fastest CCITT standard for modems is v.32bis, which provides for full-duplex communications at 14,400 bps. A forthcoming standard, "v.fast", is expected shortly and will allow modems that comply with the standard to communicate at 28,800 bps. Meanwhile, an unofficial "standard", "v.32terbo", has been developed to allow modems to communicate at 16,000 and 19,200 bps. All of the other characteristics of v.32terbo modems are the same as in v.32bis modems.

Because of imperfect impedance matching between the telephone network and both modems (the near-end modem and the far-end modem) on either end of a modem connection, part of the signal sent by a modem is reflected, first at the near-end and then again at the far-end, producing two different echo signals. These echo signals combine with the signal sent from the opposite modem. For reliable high-speed communications, these echo signals must be removed from the received signal, a process known as echo cancellation. A near-end echo canceller cancels the first-occurring near-end echo signal, and a far-end echo canceller cancels the subsequently-occurring far-end echo signal.

The time between when a modem sends a signal and the time at which a far-end echo of that signal is received at the modem is referred to as the round-trip delay time. During set-up of a high-speed modem connection, a training sequence is executed during which the round-trip delay time is estimated and the far-end echo canceller is trained so as to accurately approximate the characteristics of the echo transmission path. Far-end echo cancellation is then performed by taking the same signal sent to the far-end, delaying it by an amount equal to the round-trip delay time, varying the signal in the far-end echo canceller in the same manner as the signal would be varied along the echo transmission path, thereby producing a signal that is nearly identical to the echo signal, and subtracting this signal from the received signal.

Delaying the signal to simulate the round-trip delay has typically been performed using bulk memory, a semiconductor memory in which data representing the signals sent are successively stored and later successively mad out in the manner of a digital delay line. The delay between when a particular piece of data is stored in bulk memory and when that particular piece of data is read out of memory is equal to the round-trip delay time.

A known v.32bis modem with far-end echo canceller is shown in FIG. 1. A bit stream to be transmitted is input to a scrambler 11 which randomizes the data and inputs it to a serial-to-parallel converter 13. In the serial-to-parallel converter, the data bits are grouped into six-bit symbols. The four least-significant bits are input directly to a signal element map 19 which maps the data to points in the signal constellation. The two most-significant bits are input to a differential encoder 15, which differentially encodes which quadrant of the signal constellation the symbol occupies. The two-bit output signal of the differential encoder is input to a convolutional encoder 17, which produces a three-bit output signal having one bit of redundancy as compared to the two-bit input signal. The three-bit output signal from the convolution encoder is input to the signal element map 19 along with the four least-significant bits of the symbol. (The term trellis encoding is used to refer to the overall encoding of the symbol in the manner just described.) The symbol is then mapped to a point in the signal constellation, and the modulator 21 performs the appropriate modulation to send the symbol over the wire.

The seven-bit quantity input to the signal element map 19 is also stored in bulk memory 23 and later read out (after the round-trip delay time) and input to a duplicate signal element map 19'. The output signal from the signal element map 19' is input to a far-end echo canceller 25. As previously described, the signal is varied in the far-end echo canceller in the same manner as the signal would be varied along the echo transmission path, thereby producing a signal that is nearly identical to the echo signal, and this signal is then subtracted from the received signal.

In the case of a v.32terbo modem, a data rate of 16,000 bps requires eight trellis-encoded bits to represent a symbol to be transmitted, the least-significant five bits of which are input directed to the signal element map 19 and the most-significant three bits of which are input to the signal element map from the convolutional encoder 17. An eight-bit quantity may be conveniently stored in bulk memory for later input to the duplicate signal element map 19' and to the far-end echo canceller 25. A data rate of 19,200 bps, however, again requires one extra bit that is input directly to the signal element map 19 for a total of nine bits. Without complicated and expensive circuitry for bit manipulation, each symbol then requires two bytes of storage in bulk memory, doubling the required size of bulk memory. Doubling the size of bulk memory has a significant adverse impact on device size and cost.

What is needed, then, is a way to efficiently utilize bulk memory in a high-speed modem such as a v.32terbo modem.

SUMMARY OF THE INVENTION

The present invention, generally speaking, solves the foregoing problem by storing in bulk memory, instead of a trellis-encoded codewords, unencoded words of lesser length in bits. For a v.32terbo modem operating at 19,200 bps, for example, the unencoded word has only eight bits as compared to nine bits for the trellis-encoded codeword. Therefore, one memory word (16 bits) can be used to store two unencoded words, resulting in memory savings of 50%. More particularly, in accordance with one embodiment of the invention, full-duplex, high-speed data communications using echo cancellation is performed by storing in memory transmit data represented in a first form, at predetermined intervals substantially equal to a round-trip delay time, reading out transmit data from memory and trellis-encoding the transmit data to produce trellis-encoded transmit data, and performing echo cancellation using data derived from the trellis-encoded transmit data. In accordance with another embodiment of the invention, an apparatus for high-speed data communications includes first circuitry, having a first encoder, for producing first signal element data from multi-bit data symbols, an echo canceller, circuitry for storing the multi-bit data symbols and outputting delayed multi-bit data symbols each after a predetermined time, and second circuitry for producing from the delayed multi-bit data symbols second signal element data substantially identical to the first signal element data and for applying the second signal element data to the echo canceller.

BRIEF DESCRIPTION OF THE DRAWING

The present invention may be further understood from the following description in conjunction with the appended drawing. In the drawing:

FIG. 1 is a simplified block diagram of a known v.32bis modem with far-end echo canceller;

FIG. 2 is a simplified block diagram of a modem with far-end echo canceller illustrating the storage arrangement of the present invention; and FIG. 3 is a timing diagram illustrating a timed relation in which the convolutional encoders 17 and 17' of FIG. 2 are initialized.

DETAILED DESCRIPTION OF THE PREFERRED EMBODIMENTS

Referring to FIG. 2, a high-speed modem 10 includes a transmit data portion 12 and an echo cancellation portion 14. The transmit data portion 12 is constituted in substantially the same manner as in the known modem shown in FIG. 1, described previously. The signal bus 16, however, instead of carrying four bits as in a v.32bis modem, carries six bits in accordance with v.32terbo/19,200 bps. These six bits are passed through a trellis encoder 18 to the signal element map 19. Two additional bits are convolution encoded in the trellis encoder 18 before being applied to the signal element map. The modem 10 may be a hardware modem or a software modem, realized using a digital signal processor. The bulk memory 23' may be external to or on-board a digital signal processor.

In the echo cancellation portion 14 of the high-speed modem 10, the input to the echo cancellation portion, instead of being taken at the output of the trellis encoder 18 as in the known modem of FIG. 1, is taken at the input of the trellis encoder. That is, the six bits carried by the signal bus 16 and the two-bit output of the differential encoder 15 are input to bulk memory 23', which may then be of half the size as would otherwise be required.

In order to apply signals to the far-end echo canceller 25 as are applied to the analog transmit channel which it simulates, the two bits stored from the differential encoder 15 into bulk memory 23' must be convolution encoded when they are read out from bulk memory. A duplicate convolutional encoder 17' is provided for this purpose. The six bits stored from the signal bus 16 into bulk memory 23' are input directly to the duplicate signal element map 19'.

Comparing the transmit signal path and the echo cancellation signal path, observe that, with the exception of a delay introduced by the bulk memory 23', the data input at the serial input terminal 9 undergoes the same operations along both paths, and hence that the signals applied to the modulator 21 and to the far-end echo canceller 25 are identical except for a time shift.

During set-up of a high-speed data link, the convolutional encoder 17 in the transmit path is initialized first. Then, after a round-trip delay, the convolutional encoder in the echo canceller path is initialized. This timing relationship is illustrated in FIG. 3. In particular, at the end of a transmission sequence E and the beginning of a transmission sequence B1 as specified in v.32bis, the convolutional encoder 17 is initialized to zero. The round-trip delay time, T, has already been ascertained. After the time T has elapsed from when the convolutional encoder 17 was initialized to zero, the convolution encoder 17' is then also initialized to zero. This procedure assures that the signals applied to the modulator 21 and to the far-end echo canceller 25 are identical except for a time shift.

In the case of a software modem, implementing the convolutional encoder 17' does require a small increment of additional processing time. This penalty is slight, however, compared to the size and cost savings achieved by reducing by half the size of bulk memory required.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An apparatus for high-speed data communications, comprising:

first means, including a first encoder, for producing first signal element data from multi-bit data symbols applied to said first means;

an echo canceller;

means, connected to receive said multi-bit data symbols, for storing the multi-bit data symbols and outputting delayed multi-bit data symbols each after a predetermined time; and second means, including a second encoder, for producing, from the delayed multi-bit data symbols, second signal element data substantially identical to the first signal element data and for applying the second signal element data to the echo canceller.

2. The apparatus of claim 1, wherein the first encoder comprises:

means for receiving and encoding the multi-bit symbols to produce encoded multi-bit symbols having a length in bits greater than a length of the multi-bit symbols.

3. The apparatus of claim 2, wherein the length of the multi-bit symbols is no greater than eights bits and the length of the encoded multi-bit symbols is greater than eight bits.

4. The apparatus of claim 3, wherein the means for storing is a semi-conductor memory.

5. The apparatus of claim 4, wherein the semiconductor memory has a word length of an integral number of eight-bit bytes.

6. The apparatus of claim 5, wherein the semiconductor memory has a word length of 16 bits.

7. The apparatus of claim 2, wherein the first encoder is a convolutional encoder.

8. The apparatus of claim 7, wherein the first means further comprises means for receiving the encoded multi-bit symbols and producing in response thereto the first signal element data, corresponding to multi-level signals to be used to represent the encoded multi-bit symbols.

9. The apparatus of claim 8, wherein the means for producing the first signal element data comprises a first signal element map.

10. The apparatus of claim 9, wherein the second means comprises a second convolutional encoder and a second signal element map.

11. A full-duplex, high-speed data communications method using echo cancellation, comprising the steps of:

storing in memory transmit data represented in a predetermined form;

at the time of storing the transmit data, trellis encoding the transmit data using a first trellis encoder to produce first trellis-encoded transmit data;

using the first trellis-encoded transmit data to modulate and transmit the transmit data;

at predetermined intervals, reading out transmit data from memory and trellis-encoding the transmit data, using a second trellis encoder, to produce second trellis-encoded transmit data; and performing echo cancellation using data derived from the second trellis-encoded transmit data.

12. The apparatus of claim 11, wherein the first and second trellis encoders respectively comprise first and second convolutional encoders, the method comprising the further steps of:

at a first predetermined time, initializing the first convolutional encoder; and at a second predetermined time following the first predetermined time, initializing the second convolutional encoder.

13. The method of claim 12, wherein the second predetermined time follows the first predetermined time by an amount substantially equal to a round-trip delay.

* * * * *